(12) United States Patent
Foote et al.

(10) Patent No.: US 7,154,526 B2
(45) Date of Patent: Dec. 26, 2006

(54) TELEPRESENCE SYSTEM AND METHOD FOR VIDEO TELECONFERENCING

(75) Inventors: Jonathan T. Foote, Menlo Park, CA (US); John Adcock, Menlo Park, CA (US); Qiong Liu, Milpitas, CA (US); Timothy E. Black, Los Gatos, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 90 days.

(21) Appl. No.: 10/617,549

(22) Filed: Jul. 11, 2003

(65) Prior Publication Data

US 2005/0007445 A1    Jan. 13, 2005

(51) Int. Cl.
*H04N 7/14* (2006.01)
(52) U.S. Cl. ............... 348/14.08; 348/14.01; 348/14.16
(58) Field of Classification Search .. 348/14.01–14.09, 348/14.1, 14.11, 14.12, 14.13; 370/260, 370/261; 709/204; 379/202.01; 345/753; 248/917; 361/681, 629
See application file for complete search history.

(56) References Cited

U.S. PATENT DOCUMENTS

| 4,928,301 | A | | 5/1990 | Smoot | |
|---|---|---|---|---|---|
| 5,737,431 | A | | 4/1998 | Brandstein et al. | |
| 6,208,505 | B1 | * | 3/2001 | Kuchta et al. | 361/683 |
| 6,771,302 | B1 | * | 8/2004 | Nimri et al. | 348/14.08 |
| 2004/0011938 | A1 | * | 1/2004 | Oddsen, Jr. | 248/393 |

FOREIGN PATENT DOCUMENTS

JP    358021961 A * 2/1983
JP    411234640 A * 8/1999

OTHER PUBLICATIONS

Graham; Teleconferencing Robot With swivelling Video Monitor; Nov. 12, 1998; WO98/51078.*
Paulos, Erick and John Canny, *Ubiquitous Tele-embodiment: Applications and Implications*, Department of Electrical Engineering and Computer Science, University of California, Berkeley, pp. 1-14. http://www.prop.org/papers/blimp.pdf (Nov. 13, 2003).
Leigh, J. et al., *AccessBot: an Enabling Technology for Telepresence*, Electronic Visualization Laboratory, University of Illinois at Chicago, Jul. 2000.
Paulos, Eric and John Canny, *Social Tele-Embodiment: Understanding Presence*, Kluwer Academic Publishers, Manufactured in The Netherlands. 2001.
Bashor, Jon, *Rolling RAGE in Denver*, Sciencebeat, Berkeley Lab, Nov. 16, 2001, pp. 1-3.
Koenen, Rob, *Overview of the MPEG-4 Standard*, International Organization for Standardisation, Mar. 2002, pp. 1-80.

* cited by examiner

*Primary Examiner*—Melur Ramakrishnaiah
(74) *Attorney, Agent, or Firm*—Fliesler Meyer LLP (57) ABSTRACT

A system in accordance with one embodiment of the present invention comprises a device for facilitating video communication between a remote participant and another location. The device can comprise a screen adapted to display the remote participant, the screen having a posture adapted to be controlled by the remote participant. A camera can be mounted adjacent to the screen, and can allow the subject to view a selected conference participant or a desired location such that when the camera is trained on the selected participant or desired location a gaze of the remote participant displayed by the screen appears substantially directed at the selected participant or desired location.

23 Claims, 11 Drawing Sheets

TELEPRESENCE SYSTEM AND METHOD FOR VIDEO TELECONFERENCING

TECHNICAL FIELD

The present invention relates to video teleconferencing and transmission of audio, video, and commands between locations separated by distance.

BACKGROUND

Video teleconferencing typically uses a small number of microphones and cameras (for example, one microphone and one camera) to capture multiple participants. Each participant is represented by only a small number of pixels, and image quality can often be degraded by compression techniques used to conserve bandwidth. The combination of image size and degraded quality typically impacts image resolution such that an identity of a participant can be difficult to discern. More subtle interpersonal nuances like facial expression and degree of attentiveness can be still more difficult to discern. Further, audio gain must be set relatively high on a shared microphone in order to pick up participants at a distance of several feet or more from the microphone. Higher gain can result in acoustic feedback when the microphone picks up amplified signals from a remote location, which contain the local microphone signal.

The use of microphone arrays (or other sensors) is known in the art for reducing background noise and for identifying a location of an acoustic source. For example, U.S. Pat. No. 5,737,431 discloses a method for de-emphasizing sounds peripheral to a particular location and for steering a camera for use in a video teleconferencing system to a particular participant or other acoustic source. Such camera steering techniques are applied so that a single camera can capture multiple participants positioned in a large room, for example. These techniques fail to address the effectiveness of communication between participants as a function of image quality and scale.

The use of one-to-one terminals is known in the art for improving communication between a single remote participant and a single local participant. For example, U.S. Pat. No. 4,928,301 discloses a teleconferencing terminal which enables teleconference participants to make eye contact while communicating. Such techniques limit the number of participants in communication at a single time, and limit the nonverbal communication between participants, making a video teleconference with more than two participants cumbersome and difficult.

SUMMARY

Systems and methods in accordance with embodiments of the present invention comprise a positionable video teleconferencing device adapted to display on a screen a substantially full-scale image of a subject, facilitating video teleconferencing by providing an improved resolution remote image, thereby allowing a local participant to better discern facial gestures and expressions of the subject. Further, the device is adapted to be remotely controlled such that the device can communicate a gesture, such as nodding or shaking, or a demeanor, such as rapt attentiveness. A communication system in accordance with one embodiment of the present invention includes a camera preferably fixed in position adjacent to the screen and adapted to facilitate the display of the subject so that the subject's gaze appears to substantially meet the gaze of a selected participant when the subject views the selected participant in the local image captured by the camera. Changing the attitude of the device changes the field of view of the camera, while the attitude of the device's display can alert a participant to the camera position. The communication system can include a microphone array or other directional microphone connected with the screen for reducing gain and peripheral background noise, and for identifying the location of an acoustic source.

Systems and methods in accordance with the present invention further comprise a remote terminal for viewing local images captured by the camera, and for transmitting remote images to the device for display on the screen. The remote terminal can include controls for remotely manipulating the device to communicate nonverbal gestures, for example. The remote terminal can further include controls for adjusting the zoom of the camera lens, or for displaying text on the screen along with the local image. The two devices, local and remote, can exchange information via the internet by using available off-the-shelf video teleconferencing software and by reducing bandwidth requirements using existing techniques.

BRIEF DESCRIPTION OF THE FIGURES

Further details of embodiments of the present invention are explained with the help of the attached drawings in which.

DETAILED DESCRIPTION

Figure 1:
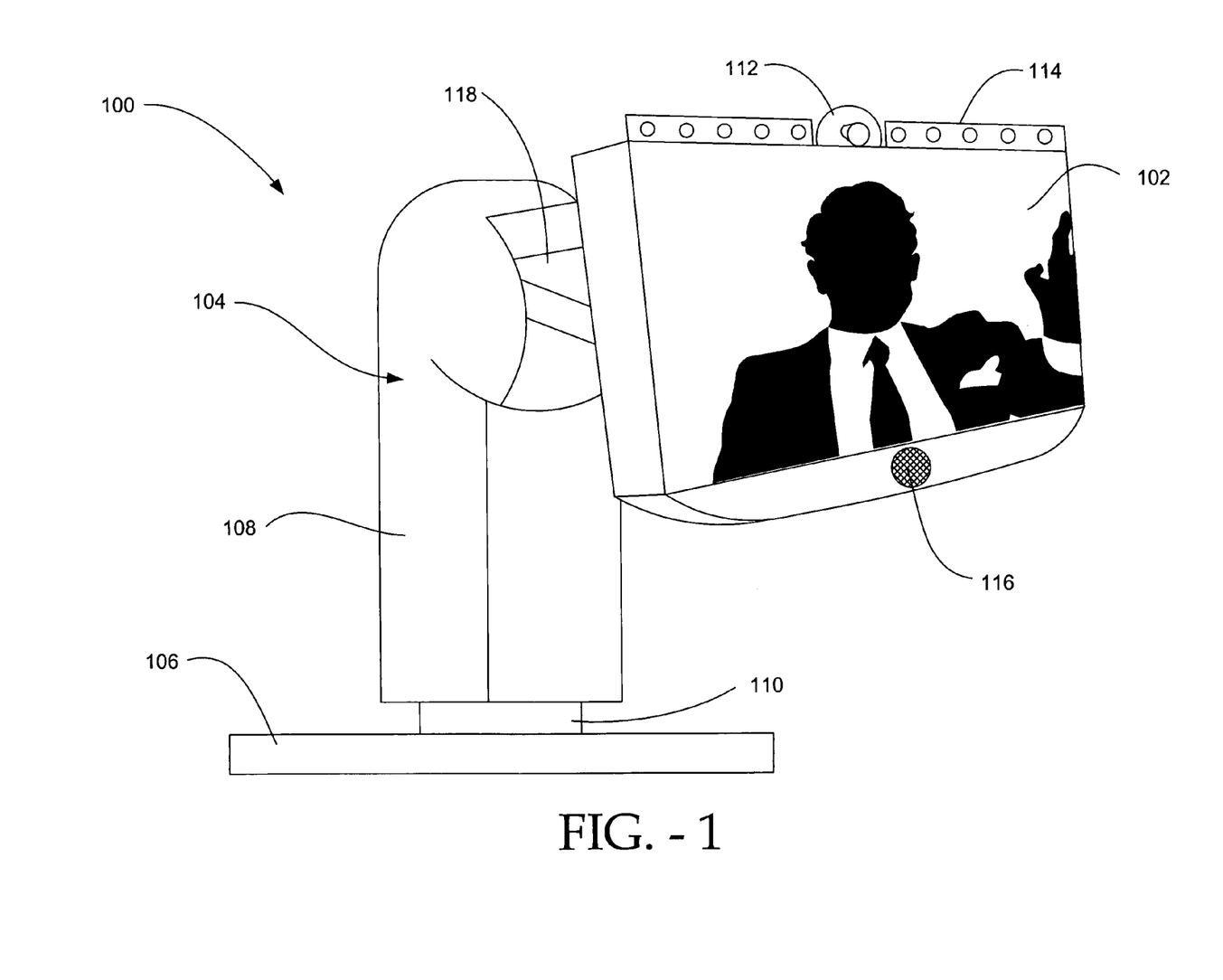
FIG. 1 is a perspective view of a device for displaying a subject from a system in accordance with one embodiment of the present invention.

FIG. 1 is a perspective view of a device 100 from a system for facilitating communication in accordance with one embodiment of the present invention. The device 100 comprises a screen 102 adjustably connected with a frame 104 such that the screen can be pivoted up or down relative to the frame 104. The frame 102 is connected with a base 106 by a rotatable bearing 110, allowing the screen 102 to rotate about the base 106. The screen 102 can be sized such that at least a portion of a subject can be displayed at substantially full scale. For example, the screen 102 can be sized so that the shoulders and head of the subject can be displayed. By displaying a full scale image of a subject at a conference, image resolution can effectively be improved over images of a smaller scale or images capturing a wider camera view. The improved image resolution can allow a subject to communicate a broader range of expression by allowing the subject to display discernable facial gestures, such as a smile or a grimace. In another embodiment, the screen 102 can be sized such that a larger portion of the subject can be viewed. For example, a screen 102 can be wide enough to display a plurality of subjects at a remote location at substantially full scale, or tall enough to display the entire body of a subject. In still other embodiments, the screen 102 can display images of subjects of a larger-or smaller-than-actual scale. In order to reduce weight, thereby facilitating movement of the screen 102, the screen 102 can be manufactured using flat panel technology in preference to bulkier, traditional cathode ray tube (CRT) technology. For example, the screen 102 can comprise a liquid crystal display (LCD), organic light-emitting diode (OLED) display, a plasma display, or similar thin, light weight screen technology.

Figure 2:
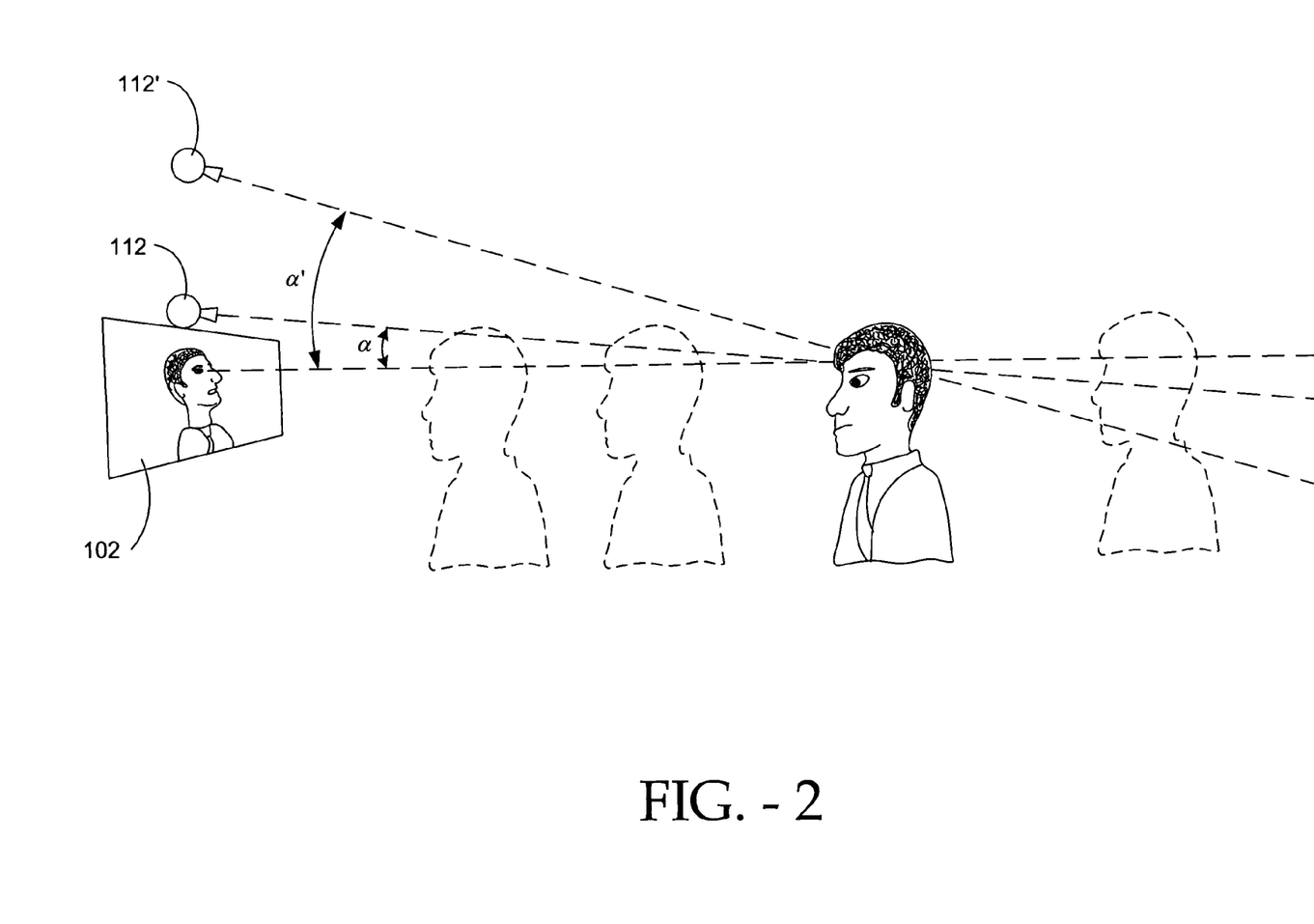
FIG. 2 is a schematic showing an optical axis of a camera positioned adjacent to and apart from a screen, relative to a gaze axis of the screen.

A camera 112 can be mounted adjacent to the screen 102 for capturing an image (for example, of a participant) for display to the subject. The camera 112 can be mounted as close to the screen 102 as possible, approximating the direction of a gaze of the subject as displayed on the screen 102. The camera 112 is fixed relative to the screen 102 so that to view a participant, the camera 112 (along with the screen 102) should be trained on the participant, thereby repositioning the camera's field of view. As illustrated in FIG. 2, by mounting the camera 112 close to the screen 102, an angle α formed between an optical axis of the camera 112 and an axis projecting perpendicularly from a plane formed by the screen 102 (gaze axis) can be minimized. A camera 112' mounted apart from the screen 102 can incorporate a relatively large angle α' between the optical axis of the camera 112' and the gaze axis. Viewing a participant seated closer or farther away from the screen 102 can require the camera 112' to pivot up or down, or rotate to one side to find an appropriate field of view. The motion of the camera 112' can be large where the angle α' is large, and the gaze of the subject displayed by the screen 102 can appear at the participant's chest, above the participant's head, or to the side of the participant. These scenarios can be distracting for the participants. In contrast, where a camera 112 is mounted just above the screen 102, training the camera 112 on a participant seated closer or farther away from an optimal view point requires a much smaller pivot or rotation movement relative to a camera positioned at a distance from the screen 102 when finding an appropriate view point. The gaze axis includes less variation as the pivot or rotation movement of the camera 112 is minimized, allowing an illusion that the subject is matching the gaze of each participant when the camera 112 is trained on that participant.

The camera 112 mounted adjacent to the screen 102 can be mounted above the screen 102, but alternatively can be positioned below the screen 102 or to one side of the screen 102. Alternatively, the camera 112 can be mounted away from the screen 102 with a field of view incorporating a predicted angle α', particularly where the predicted angle α' is approximately consistent for a camera 112 mounted an equal distance from each of the participants. In still other embodiments, the camera 112 can be independently adjustable and include a means for determining angle from the camera 112 to the participant so that an appropriate attitude of the screen 102 can be adjusted to create the illusion that the subject is meeting the participant's gaze. One of ordinary skill in the art can appreciate the different ways in which the illusion can be created of a subject meeting a participant's gaze.

Figure 3A:
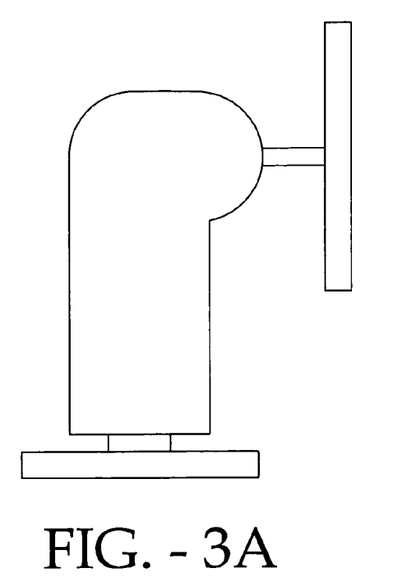
FIG. 3A is a side view of the device of FIG. 1 in a neutral position.

The frame 104 allows the screen 102 to be positioned forward or backward of, and above or below a neutral position. The frame 104 comprises a trunk 108 and a neck 118 connected with the trunk 104 at a pivot. As shown in FIG. 3A, the neutral position can be defined as a position wherein the trunk 108 is erect, that is, aligned with an axis A through the center of the rotatable bearing 110, and further wherein the neck 118 is orthogonally connected with the trunk 108 along an axis B. The frame 104 can move so that a plurality of postures can be assumed at the direction of the subject displayed on the screen 102, or alternatively at the direction of a participant, a third party, or by automation. The postures can communicate levels of attentiveness and/or engagement in a conference, and/or can communicate non-verbal gestures.

Figure 3B:
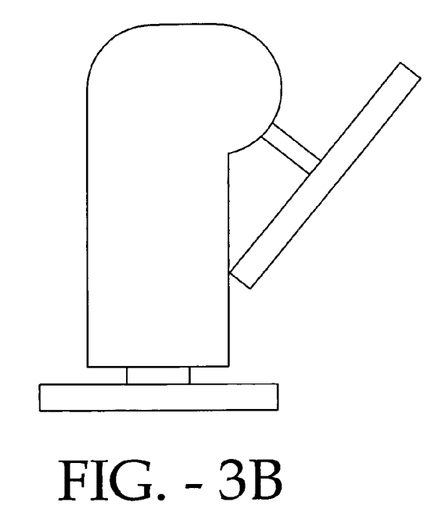
FIG. 3B is a side view of the device of FIG. 1 in an inactive position.

FIG. 3B shows the frame having a posture that can be associated in one embodiment with inactivity, as for example, where a subject is absent or otherwise not participating in a conference. The trunk 108 is erect, while the neck 118 is pivoted such that the screen 102 is below the neutral position, and points substantially downward, forming an acute angle between the trunk 108 and the neck 118. The posture implies a lack of activity by disallowing the subject displayed on the screen 102 to be viewed by a participant, therefore preventing a participant from engaging a subject. Many different postures can be programmed to represent inactivity on the part of the subject; for example, the trunk 108 can be shifted forward with the neck 118 pivoted downward, or the trunk 108 can be shifted backward with the neck 118 pivoted upward.

Figure 3C:
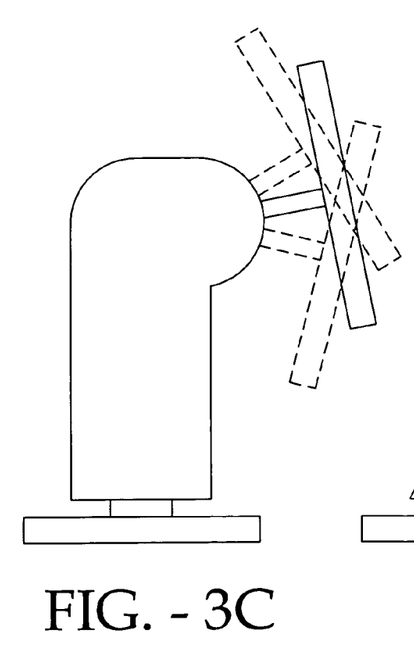
FIG. 3C is a side view of the device of FIG. 1 nodding affirmation.

FIG. 3C illustrates an example of a nonverbal gesture communicated using movement of the frame 104. The trunk 108 is erect, while the neck 118 is pivoted such that the screen 102 moves from a position slightly above the neutral position to slightly below the neutral position, and then returning to the position slightly above the neutral position, with the movement repeated as desired. The movement of the screen 102 mimics a nodding of a person when he or she wants to show agreement or approval. Agreement or approval can be communicated by movement in a number of different ways. Similarly, other non-verbal gestures, such as shaking in disagreement, can be communicated by movement of the frame 104 alone, or coupled with rotation of the frame 104 via the rotatable bearing 110.

Figure 3D:
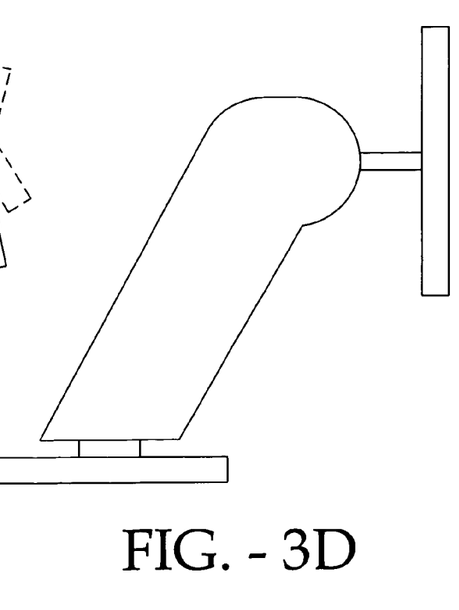
FIG. 3D is a side view of the device of FIG. 1 in an attentive position.

FIG. 3D illustrates another example of communicating level of attentiveness using movement of the frame 104. The trunk 108 is shifted forward so that the screen 102 moves forward and below the neutral position. The motion of the frame 104 appears to mimic the motion of an individual leaning forward in rapt attention or interest. A slight pivoting of the neck 118 upward can be coupled with movement of the trunk 108 to complement the forward motion so that the subject displayed on the screen 102 can appear more directed at a participant.

In addition to the camera 112, one or more speakers 116 can be connected with the communication system for producing sounds captured at the remote location of the subject displayed on the screen 102. The speaker(s) 116 can be mounted along the periphery of the screen 102, or alternatively can be detached from the screen 102. In other embodiments, the screen 102, or a screen overlay, can be used to produce sound and can serve as both display and speaker for the device 100. For example, Matsushita Electronic Components Co. Ltd manufactures screens capable of producing both images and sound using "Sound Window™" technology. A screen 102 can reduce the component count of audio/video devices by including a special, transparent sound-producing film, which acts as a transducer, placed over an LCD screen. Using a sound-producing screen 102 or screen overlay can enhance the illusion that a subject is physically present at a conference by emitting sound from an image of the subject and by eliminating visual cues of the subject's remoteness, such as speakers 116, from the device 100.

A microphone can be connected with the device 100 for detecting sounds produced in a room. Alternatively, a microphone array 114 can be fixedly connected with the screen 102, allowing the system 100 to determine the direction of acoustic sources in the room, such as participants. Sound information can be used to point the screen 102 in the direction of an acoustic source, or to cue the subject aurally or visually to a location of an acoustic source. This can be particularly useful when the participant who is speaking is not in the camera view. The subject can be cued in which direction to move the camera 112 to capture the acoustic source. The direction of the microphone array 114 can be electronically steered so that the camera 112, screen 102 and microphone array 114 are oriented to the location automatically. Alternatively, the system can be semi-automated, allowing the subject to choose to which acoustic source to direct the screen 102, and once a selection is made by the subject, orient to the acoustic source.

The microphone array 114 can serve as a directional microphone using beam-forming algorithms, allowing the system to filter noise peripheral to an acoustic source, for example when the microphone array 114 is directed at the acoustic source. A common problem encountered when using a shared microphone for teleconferencing is that the gain must be set quite high to pick up teleconference participants at some distance from the shared microphone, and the gain must be reasonably omnidirectional to ensure all participants are audible. The distance can lead to acoustic feedback when the microphone picks up an amplified signal from a remote location which contains the microphone signal. A directional microphone array 114 can significantly decrease the audio feedback problems that plague conventional teleconferencing by reducing the overall gain except in the direction of interest. The microphone array 114 can be mechanically pointed with the camera 112, again while providing visual cues as to the direction of an off-camera acoustic source. The microphone array 114 can be directed at the acoustic source and can differentially amplify the acoustic source while keeping overall gain low, thus reducing feedback.

Feedback can further be reduced by providing each subject with a dedicated audio channel and applying techniques such as noise-gating and "ducking" to each channel. These techniques reduce microphone gain when the subject is speaking, reducing feedback. Visual cues can indicate when the subject or participant is attempting to "barge-in."

As well as enhancing signals from a given direction, microphone arrays 114 can also be configured to suppress sounds originating from other directions. As mentioned, microphone arrays 114 can provide electronically steerable directionality. A microphone array 114 can provide directional speech pickup and enhancement over a range of participant positions. When the microphone array 114 is steered toward a participant, a participant outside of the primary receptive area of the microphone array 114 effectively has his or her input channel switched off even though both participants share a physical set of nearby microphones. Spatial filtering with microphone arrays 114, intelligent gain management (ducking), traditional monophonic echo cancellation techniques, and adaptive filtering, each alone and/or in combinations can provide a more robust and natural communication channel.

In other embodiments, a different type of directional audio pickups such as parabolic or "shotgun" microphones can be used as a directional microphone. In addition, in some embodiments local microphones (or microphone arrays 114) and/or cameras 112 can support "side-channel" audio. By moving physically close to the device 100 and speaking softly, a participant can exchange information with the subject without disturbing other participants. A near-field microphone can enhance this capability by attenuating far-field audio.

Figure 4:
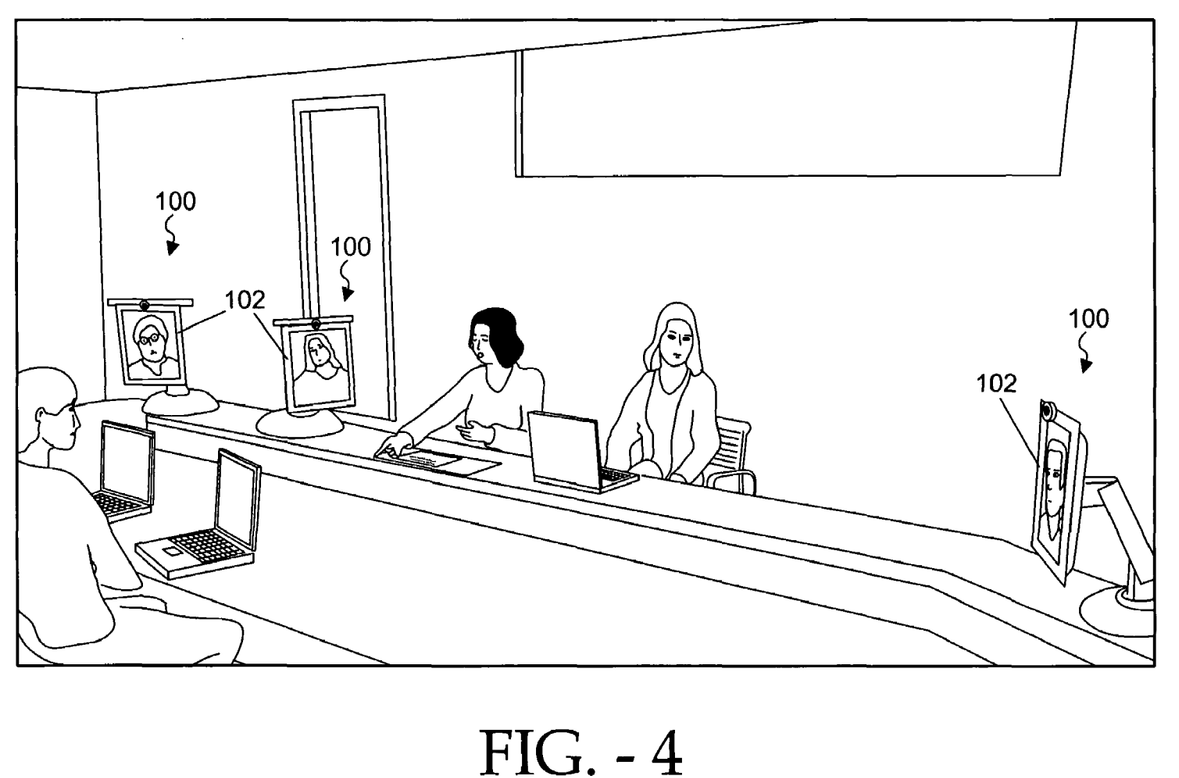
FIG. 4 is a rendering of a meeting including a plurality of devices of the type shown in FIGS. 1 and 2A–2D.

As can be seen in FIG. 4, one or more of the devices 100 can be substituted for remote participants at a conference. A subject displayed on a first device 100 appears as a participant to a subject displayed on a second device 100. Any subject, therefore, can potentially interact with any participant within the device's 100 range of motion, whether the participant is a person seated at a conference table, another device 100, or simply a microphone, a video camera, a telephone (for example having an intercom feature including a microphone and speaker), a second videoconferencing system, etc. One of ordinary skill in the art can appreciate the myriad different methods for capturing or receiving communication and/or images from a device 100. Using a substantially full-scale image capable of motion can assist in creating the illusion that a person is physically present in the conference room, thereby allowing the subject to communicate more effectively and command the same amount of focus and attention of the participants as the subject would were she or he physically present.

In use, one or more devices 100, each adapted to substitute a remote participant (a subject), can be placed on a conference table. Any arrangement of the device(s) 100 can be used, but will preferably mimic the placement of humans. (In other embodiments, however, multiple devices 100 potentially can be stacked to conserve space.) For example, a natural setup would include local participants on one side facing a row or semicircle of devices 100. Because a device 100 is roughly the width of a human, multiple devices 100 can be arranged in the same corresponding locations as the remote participants, and can be rearranged by moving the devices 100 around the table. To a local participant, the remote participant(s) appear as roughly life-size head images "seated" around the table. The screen 102 of a device 100 can alternatively be connected with a meeting room chair for added realism. In some embodiments, multiple remote participants can share a device 100 by switching video and control signals.

A variation of the above occurs when a subject has only telephone access. Though there might be an image available if the subject uses a camera-enabled phone, typically there is no image available. A pre-existing still picture can be used as a stand-in on the screen 102, perhaps annotated with the subject's location.

Figure 5:
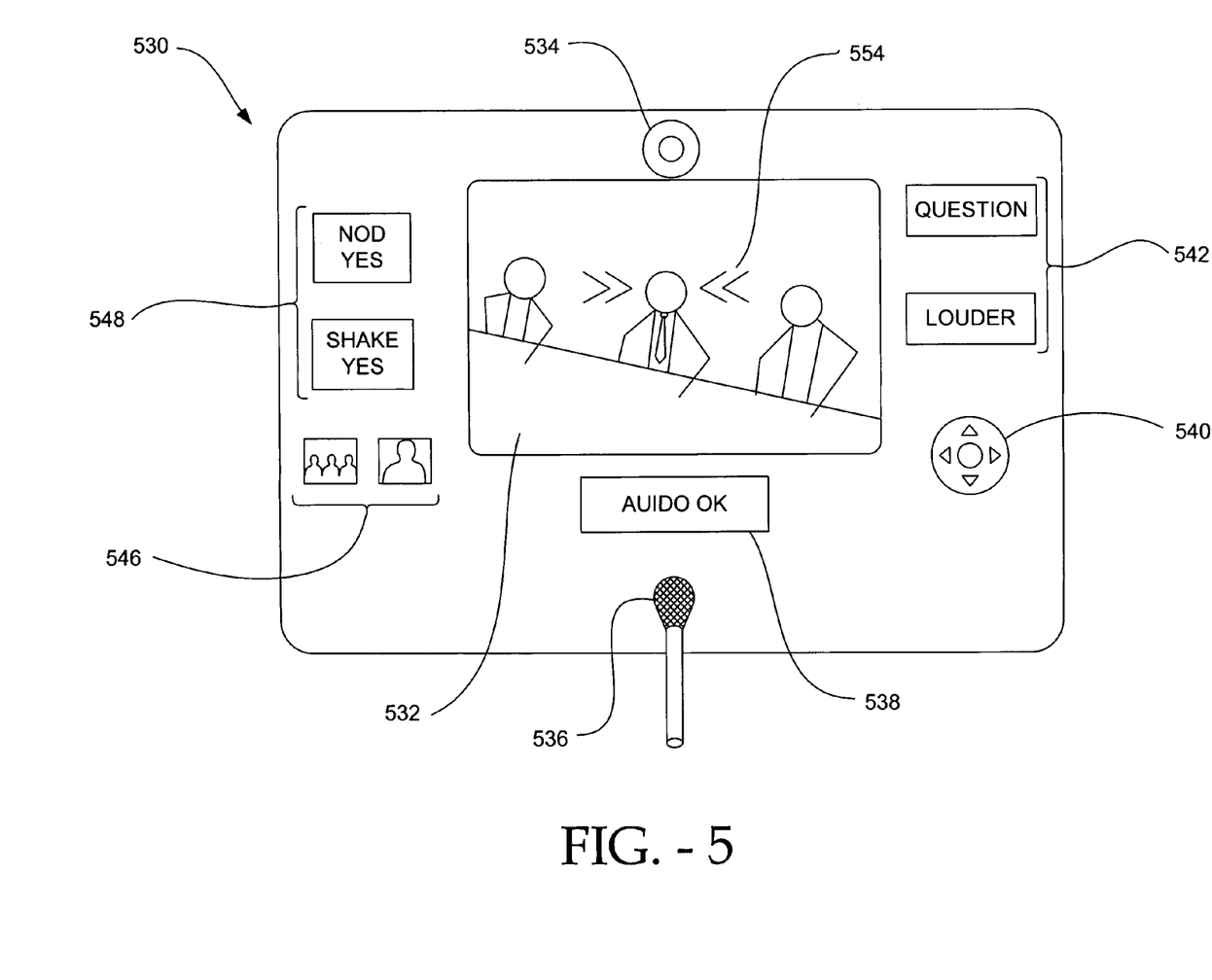
FIG. 5 is a front view of a remote terminal.

Referring to FIG. 5, a subject displayed on the screen 102 can receive an image captured by the camera 112 on a remote terminal 530 at a location of the subject. The remote terminal 530 includes a remote display 532 for displaying the image. The function and form of the remote terminal 530 can be different from that of the device 100. In most situations, the remote terminal 530 can command the subject's attention because the subject's effective field of view is defined by the remote display 532, in contrast to a participant present at a conference, whose attention can be divided by distractions in a room. Therefore, the scale of an image displayed on the remote display 532 can be much smaller (or much larger) than an image displayed on the screen 102. Further, the image captured by the camera 112 can have an adjustable field of view, allowing the subject to widen the field of view for visually scanning the room, for example, to more quickly select a participant to engage.

A remote camera 534 is connected with the remote terminal 530 adjacent to the remote display 532 and trained on the subject while the subject is seated in view of the remote display 532. The image of the subject captured by the remote camera 534 is displayed on the screen 102 of the device 100. As with the camera 112 connected with the device 100, the angle between an optical axis of the remote camera 534 and the line of sight from the subject to the remote display 532 can be minimized so that the subject appears to look directly into the remote camera 534, and by extension directly out of the screen 102 and at the selected participant. As shown in FIG. 5, the remote camera 534 can be mounted above the remote display 532. In other embodiments, the remote camera 534 can be mounted below the remote display 532, or on either side of the remote display 532.

In still other embodiments, the remote camera 534 can be mounted behind the remote display 532. For example, the remote display 532 can be transparent and the remote camera 534 can capture an image of the subject through the transparent remote display 532. The remote display 532 becomes translucent when a local image captured by the camera 112 is projected against a half-silvered mirror and onto the remote display 532. By alternating rapidly between capturing the image of the subject and displaying the local image, the remote terminal 530 can capture the direct gaze of the subject without distracting the subject. The depth and weight of the remote terminal 530 may or may not be increased by the inclusion of the half-silvered mirror and a projector; however, because the subject is not required to move about a room or deflect his or her gaze to participate in the conference, the remote terminal 530 can be stationary, and therefore can be bulkier.

A remote microphone 536 is connected with the remote terminal 530. In conventional video teleconferencing the subject has no awareness of the audio quality at the remote location. Because feedback limits the available dynamic range of far-field microphones, the subject may be completely inaudible despite speaking loudly. A remote terminal 530 from a system in accordance with one embodiment of the invention uses near-field microphones 536 and audio quality monitoring. A visual or other indication of audio quality can automatically be provided to the subject by monitoring audio signal strength. Calculating an average envelope (absolute value) of the audio signal and thresholding the audio signal can provide a good indication of signal strength. For example, a green lit audio monitor display 538 can indicate that the subject is speaking closely enough and loudly enough to the remote microphone 536 to produce a good audio signal. A red lit audio monitor display 538 can indicate that the subject must speak louder or closer to the remote microphone 536 to be heard.

Monitoring audio signal quality allows microphone gain to be set relatively low, substantially reducing feedback problems. Each subject should be physically close to the remote microphone 536 to produce a good signal indication. The close positioning of the subject allows the camera 534 to capture a close-up image of the subject. The camera 534 can be adjusted to produce a close head-and-shoulders image of the subject speaking into the associated microphone 536. A close head-and-shoulders image results in a better image than available from a camera positioned at a distance. In particular, a close head-and-shoulders image can always be face-on and the subject's face can extend over a large portion of the image.

Several features support extra-channel communication between the remote location and the conference. As mentioned above, when an acoustic source location has been estimated using the microphone array 114, the direction information can be used to inform the subject about which direction to pan the camera 112. For example, a visual cue, such as flashing direction arrows 544 on the remote display 532 can indicate the direction of an acoustic source relative to the displayed image. This can be particularly useful where the acoustic source is not in the camera view. Further, the sound channel can be spatialized so that the sound seems to come from a particular direction. The MPEG-4 standard allows audio objects to be given a location in a 3-D sound space [IS02002]. This can be an elegant technique for remotely reproducing acoustic cues available in the local environment.

As mentioned above, the camera 112 can zoom out or zoom in to allow the subject to selectably switch between a wide view capturing several participants and a narrow view capturing approximately a single participant at a larger scale. With the wide view displayed on the remote display 532, the subject can more quickly and easily identify a participant that he or she wishes to engage with a minimum amount of panning of the camera 112. Once a participant has been selected, the subject can switch to the narrow view, zooming in to capture and display a close up (and therefore higher resolution) view of the selected participant. In one embodiment, one or more buttons 546 can be provided on the remote terminal 530, for example around the periphery of the remote display 532 as shown in FIG. 5, or on a control panel either connected with or separate from the remote terminal 530. The camera 112 can be bimodal, allowing the subject to select between an "optimal" wide view and an "optimal" narrow view, or the camera 112 can allow the subject to control the zoom, thereby allowing the subject to control how wide or narrow the view displayed on the remote display 532. In other embodiments, a joystick can be used to control zoom, while in other embodiments keystrokes on a keyboard can control zoom. One of ordinary skill in the art can appreciate the multitude of different control mechanisms for controlling camera zoom.

The device 100 can be controlled by the subject via either a collective control panel or one or more separately positioned control mechanisms. As shown in FIG. 5, the attitude of the camera 112 (and the screen 102), can be controlled by a joystick 540 that can send commands to the device to rotate about the rotatable bearing 110 while pivoting the screen 102. A joystick is a simple mechanism that can allow smooth control over a broad range of motion. Alternatively, position buttons can be used to move the screen 102 by separately pivoting (pressing an up or down button) or rotating (pressing a left or right button) the screen 102. Movements can be combined by pressing multiple position buttons in series or at the same time. In other embodiments, the camera 112 can be controlled by a trackball, while in still other embodiments the camera 112 can be controlled by keystrokes on a keyboard. One of ordinary skill in the art can appreciate the different control mechanisms for moving the camera 112.

In addition, a series of movements can be combined and programmed into "hot" buttons 548 that allow the subject to execute a series of movements indicative of a nonverbal gesture by manipulating a minimum number of control mechanisms. For example, an affirmative or agreeable nod (as described above) can be programmed into a single "NOD/YES" button. When the NOD/YES button is pressed, the device 100 remotely performs the series of movements that include pivoting the screen 102 up and down repeatedly. A negative shake can be programmed to rotate back and forth about the rotatable bearing 110. One of ordinary skill in the art can appreciate the different movements that can be combined to indicate nonverbal gestures. In other embodiments, the remote terminal 530 can include programmable buttons that can allow the subject to program preferred or unique device movements. In still other embodiments, the programmable buttons can be used to store positions of selected participants, so that, for example, the subject can instantly reposition the device 100 so that the camera 112 and screen 102 faces an individual chairing a conference or an individual of importance.

Other control mechanisms on the remote terminal 530 can be used to communicate textual, graphic, or other visual messages on the screen 102, or physically on the device 102. For example, a "question" or "attention" message on the screen 102 or a light illuminated on the device 100 can be activated in response to a corresponding button 542 or other control mechanism on the remote terminal 530. In this manner, the subject can signal for attention without verbal or otherwise audible cues. In other embodiments, a keyboard connected with the remote terminal 530 can be used to deliver text messages to the screen 102. For example, a lengthy message can crawl across the top or bottom of the screen, drawing the attention of participants and allowing participants to view information without audible disruptions.

Multiple techniques can be combined to reduce an overall bandwidth required for the system. For example, given good noise gating, no signal need be transmitted when a noise gate is off. Because it can be infrequent that more than one participant will speak at one time, overall audio bandwidth required for the system can be substantially the same as the audio bandwidth required for a single audio channel. Where voice-over-IP technology (VOIP) is used, the system is capable of sending no packets when the noise gate is on. One implementation of multicast VOIP uses a half-duplex "token passing" system where only a source with a token is allowed to broadcast to all receivers.

Further, video can be compressed as well. Because images consist primarily of talking heads, they can be compressed using the MPEG-4 standard, which supports facial animation. Large amounts of bandwidth can be conserved by transmitting only facial animation characteristics rather than an entire video signal [IS02002]. This process is greatly facilitated by use of the present invention, where cameras are preferably tightly focused on a single individual.

Figure 6:
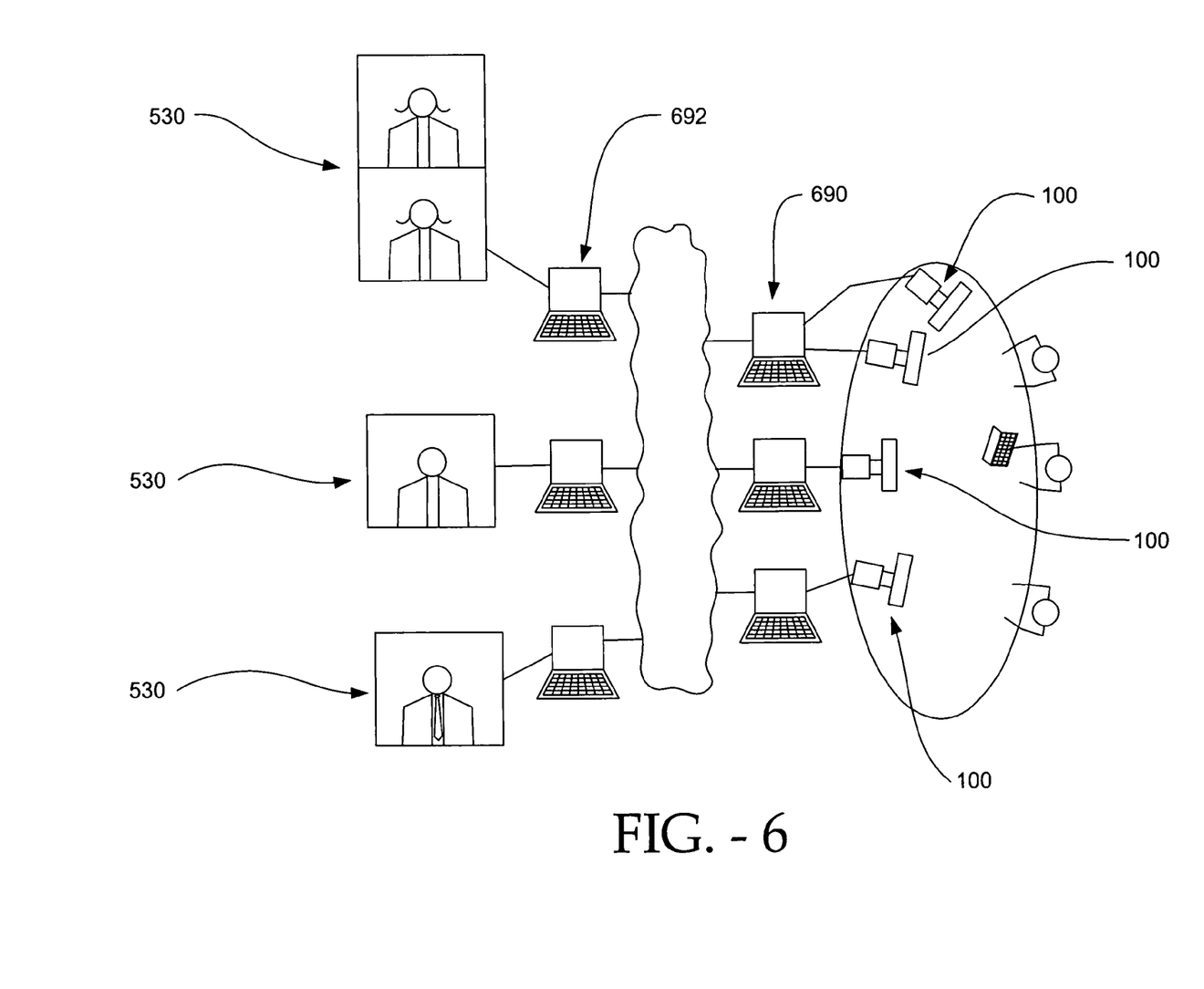
FIG. 6 is a top down view and schematic of a conference.

Video and audio exchange within the system (i.e. between local and remote participants) can be accomplished via conventional web camera/meeting software such as Microsoft Windows NetMeeting or CuSeeMe, or customized software, and can be managed on any platform such as Linux, Unix, or Mac (with compatible applications). As shown in FIG. 6, two host computers ("servers"), one each at the local and remote sites, can support two device pairs (each device pair comprising a remote terminal 530 and a device 100) for two remote participants. Where the teleconferencing software runs on the Internet Protocol, the system scales naturally and reliably by adding more device pairs (with servers) given available bandwidth between the teleconferencing sites. In addition, the device pairs can be "forked" or multicast so that one microphone/camera input at the conference can supply more than one display/speaker outputs at more than one remote site.

Figure 7:
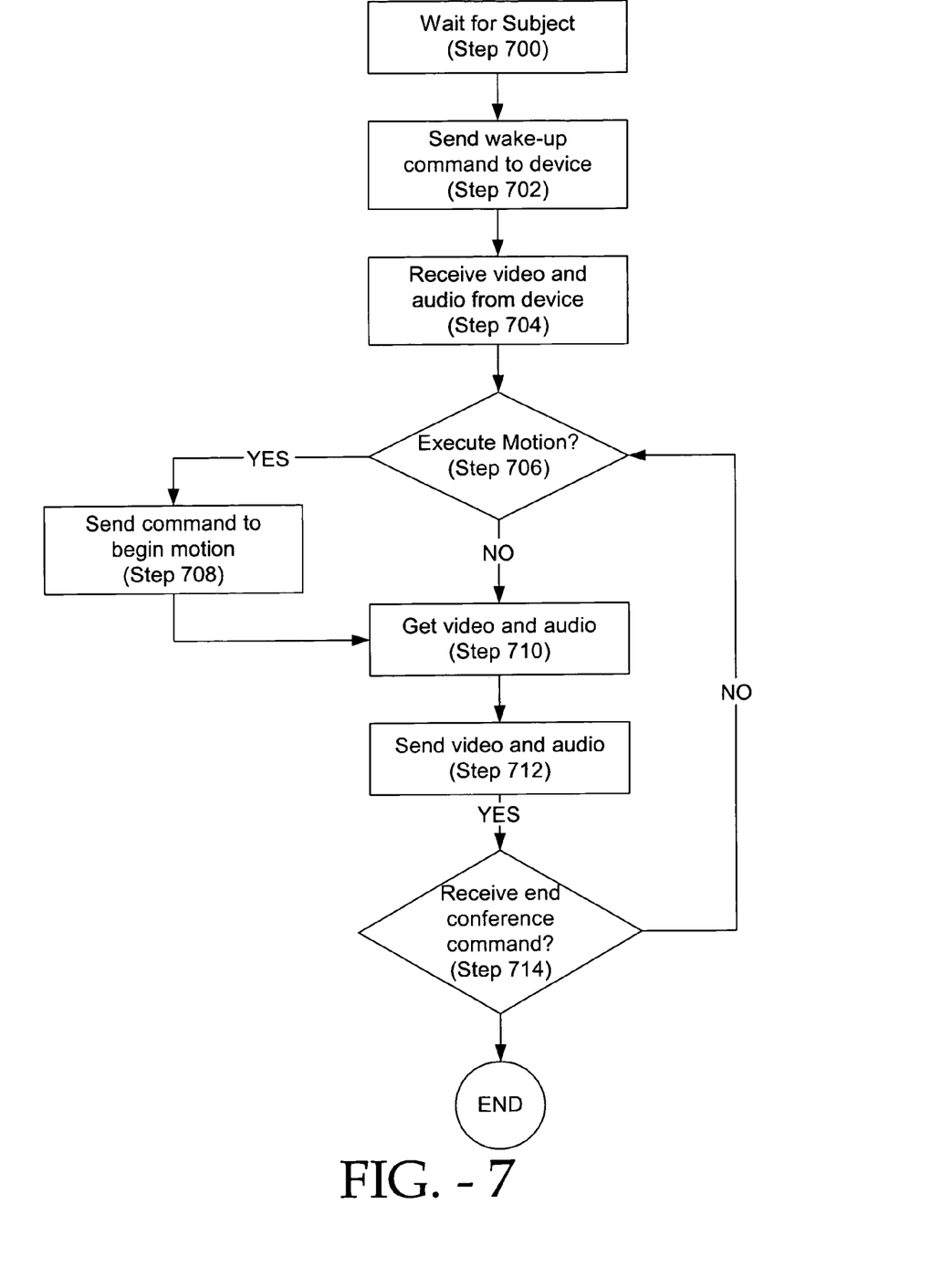
FIG. 7 is a flowchart showing server logic control.
Figure 8:
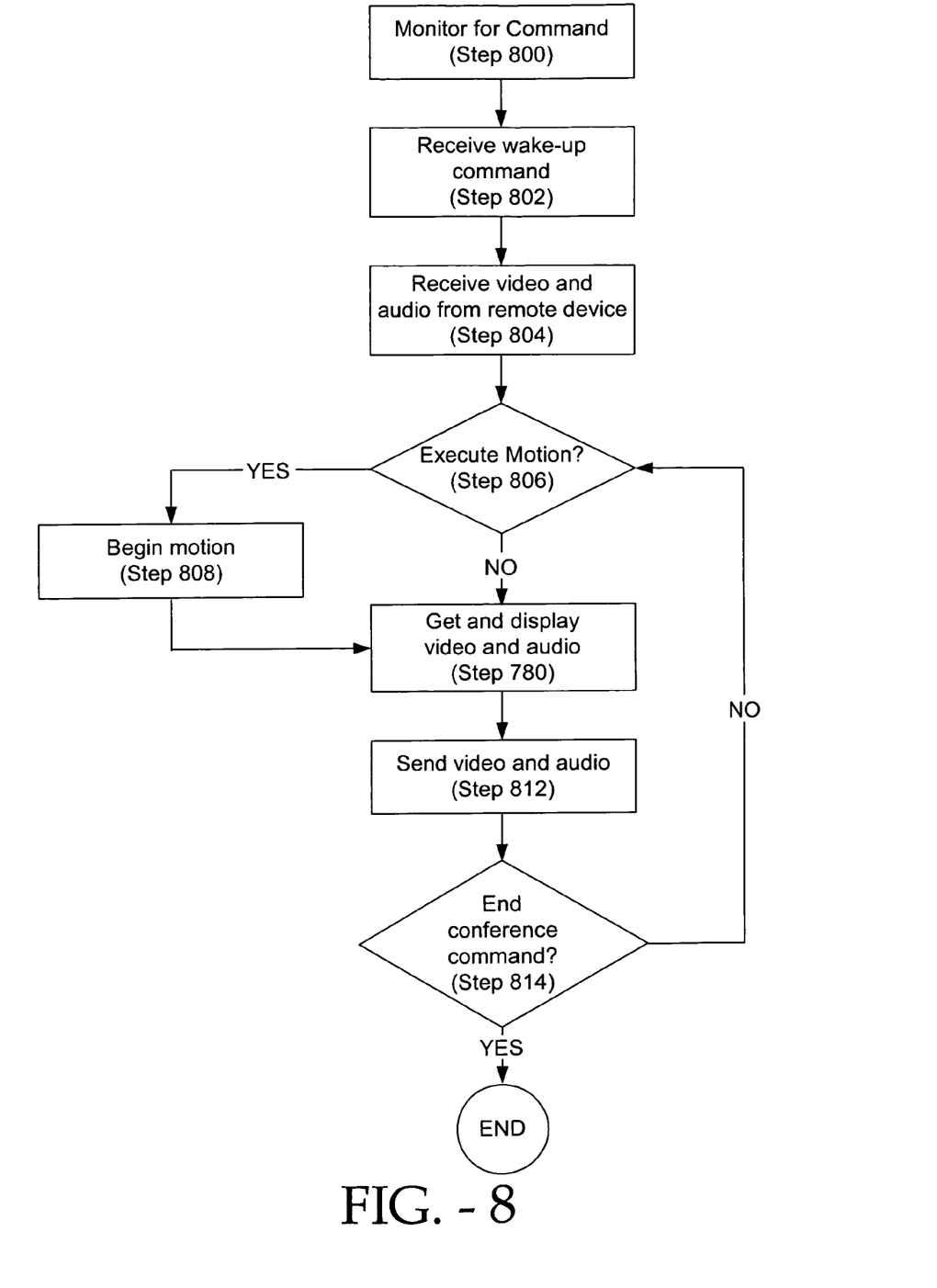
FIG. 8 is a flowchart showing remote logic control.

FIGS. 7 and 8 are flowcharts showing logic control for the remote and local servers 692,690. The remote server 692 waits for the subject to initiate a wake-up command to "awaken" the remote terminal 530 and device 100 (step 700). In one embodiment, the wake-up command can be a series of keystrokes, for example on a keyboard connected with the remote terminal 530, while in other embodiments the wake-up command can be a single keystroke or "ON" button, for example. In still other embodiments, simply manipulating or handling a control mechanism, for example a joystick, can send a wake-up command to the remote terminal 530. One of ordinary skill in the art can appreciate the different means for signaling the remote terminal 530 that the subject is ready to begin operating the system.

The device 100 can remain in an inactive position (as described above) with the local server 690 monitoring for a command from the subject (step 800). Once the subject awakens the remote terminal 530, the remote server 692 sends a wake-up command to the local server 690 (step 702). The device 100 receives the wake-up command from the local server 690 (step 802) and can, for example, assume a neutral position (in some embodiments the device 100 must first find home to determine position before assuming the neutral position). As the device 100 executes the wake-up command, the screen 102 and camera 112 turn on. The remote server 692 and local server 690 begin receiving video and audio from the camera 112 and remote camera 530 respectively (steps 704 and 804). Where the remote server 692 sends a command to begin a motion simultaneously with a wake-up command (for example, where a joystick is manipulated), the device 100 can begin executing the motion (steps 806 and 808) after the device 100 has found its position. After a motion has been executed, the remote and local servers 692,690 continue to send (steps 712 and 812) and receive (steps 710 and 810) video and audio while monitoring for additional motion commands or other commands (such as sending text messages or other visual cues) until an end conference command is received (steps 714 and 814) either from the subject, a participant, or a third party. In other embodiments, the end conference command can be automatically sent to the remote and local servers 692,690 for example after a predetermined time has lapsed without receiving a command. In still other embodiments, a sound transducer can monitor for sound, sending an end conference command to the remote and local servers 692,690 after a predetermined time has lapsed without detecting activity at the remote or local location. One of ordinary skill in the art can appreciate the myriad of different ways by which a conference can be ended, or the device 100 and/or remote terminal 530 can be deactivated.

In other embodiments, rather than simply monitoring for a motion command, the device 100 can be automated. For example, as mentioned above, a microphone array 114 can be programmed to direct the device 100 so that the microphone array 114, and by extension the camera 112 and screen 102, trains on an acoustic source. Alternatively, the remote or local servers 692,690 can monitor video images and drive the camera 112 to follow a particular object as the object moves, for example based on detection of "optical flow." An automated or semi-automated mode can be switched on or off, for example, by a control connected with the remote terminal 530. One of ordinary skill in the art can appreciate the different means for coordinating the remote and local servers 692,690 to operate the remote terminal 530 and device 100.

Figure 9:
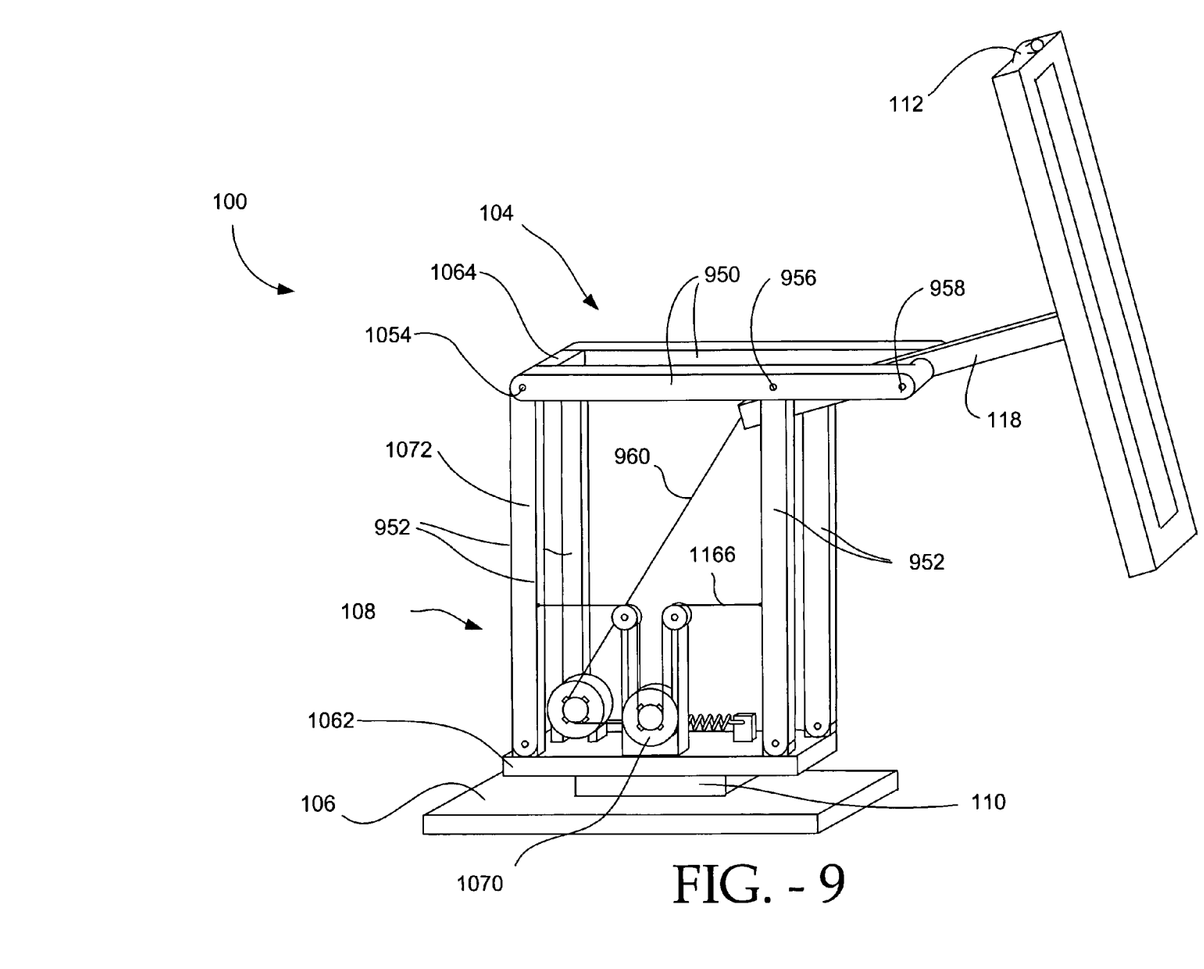
FIG. 9 is a perspective view of the device of FIG. 1 showing a trunk and neck of the frame.

As mentioned above, movement of the device 100 is accomplished by rotation and/or pivoting of the trunk 108 and/or pivoting of the neck 118. FIG. 9 illustrates a view of a device 100 according to one embodiment of the present invention. The frame 104 can be covered by a skin comprised of an elastic material, for example rubber. The elasticity of the skin can provide additional rigidity to the frame 104 and can urge the frame 104 to return to a position conforming to the shape of the skin, for example a neutral position. In other embodiments, the skin can comprise a more pliant material, such as vinyl. The frame 104 includes a plurality of support members connected at pivots to form the trunk 108 and the neck 118. The support members can comprise aluminum, plastic (for example molded or extruded high density polyethylene) or other suitable light weight, rigid material.

The trunk 108 can comprise four vertical support members 952 (arranged in two pairs) pivotally connected at a first end with a platform 1062 such that the vertical support members 952 can selectively pivot in one of two directions. The platform 1062 can be connected with the rotatable bearing 110 such that the platform 1062 can rotate relative to the base 106. The trunk 108 can further comprise two horizontal support members 950, each horizontal support member 950 being pivotally connected with an opposite pair of vertical support members 952 at a rear pivot 1054 and a front pivot 956. Each horizontal support member 950 includes a first end and a second end, with the second end extending beyond the front pivot 956 and including a forward pivot 958 for connecting the trunk 108 with the neck 118.

The forward pivot 958 can extend beyond the front pivot 956 as desired to improve the range of motion for the screen 102. For example, the forward pivot 958 can be extended such that the trunk 108 can pivot backward relative to the platform 1062, while permitting the screen 102 to pivot up and/or down without contacting the trunk 108. Similarly, in an inactive position, where the forward pivot 958 extends a desired distance beyond the front pivot 956, the screen 102 can droop down without contacting the trunk 108. As the vertical support members 952 pivot forward or backward relative to the platform 1062, the horizontal support members 950 remain substantially parallel to a plane formed by the platform 1062 and base 106; thus, up and/or down pivot motion of the display 112 can be substantially independent of forward or back motion of the trunk 108. A brace 1064 connects the horizontal support members 950 and opposite pairs of vertical support members 952 at the rear pivot 1054 of each pair.

The neck 118 can comprise a rectangular sub-frame pivotally connected with the horizontal support members 950 at the forward pivot 958 and positioned between the pairs of vertical support members 952 such that the screen 102 can be raised or lowered along an arc, allowing the device to communicate nonverbal gestures as well as to adjust the attitude of the camera 112 for viewing a selected participant or desired location. The neck 118 includes a first end connected with the screen 102, and a second end connected with a screen pivot belt 960. The neck 118 is positioned at the forward pivot 958 such that the neck 118 and screen 102 are sufficiently balanced as to allow a motor to draw or hold the screen pivot belt 960 to elevate or maintain the position of the screen 102.

Figure 10:
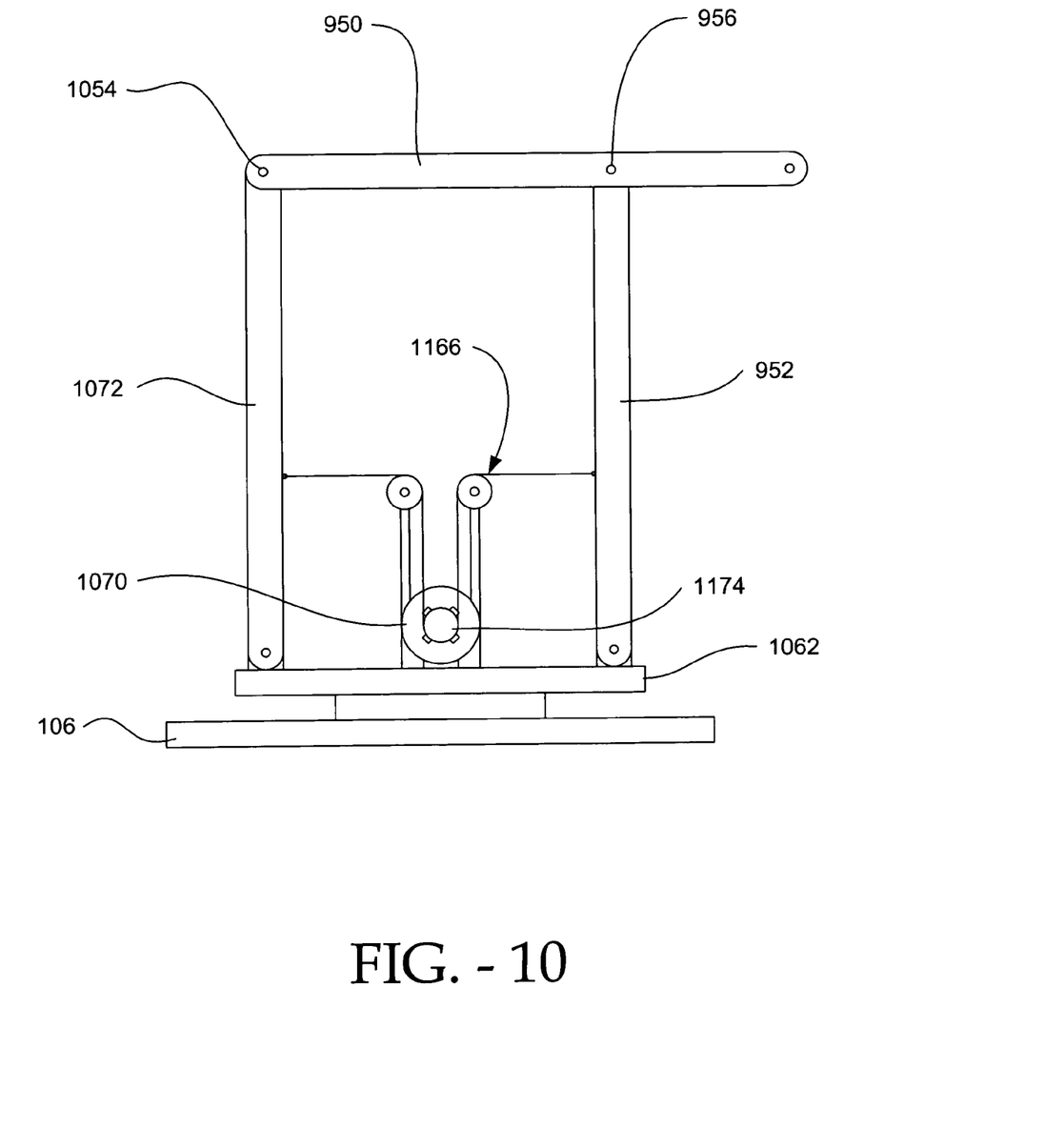
FIG. 10 is a close-up view of the pulley mechanism for elevating and lowering the screen.

Movement of the device 100 can be achieved using motors for example. In one embodiment, an extension motor 1070 connected with the platform 1062 is adapted to move a trunk pivot belt 1166 so that the trunk 108 pivots forward or backward. As can be seen in FIG. 10, the trunk pivot belt 1166 can be connected at a first end to a rear vertical support member 1072 and connected at a second end to a forward vertical support member 1072. The trunk pivot belt 1166 is arranged so that the belt partially loops around a first cog 1174 connected with the extension motor 1070 such that the belt can be drawn by the first cog 1174. The extension motor can rotate either clockwise or counterclockwise, and as the extension motor 1070 operates teeth from the first cog 1174 grab the trunk pivot belt 1166. Rotating clockwise causes the length of belt connected between the rear vertical support member 1072 and the extension motor 1070 to increase, and the length of belt connected between the forward vertical support member 952 and the extension motor 1070 to decrease, causing the frame 104 to pivot backward. Rotating counterclockwise creates the opposite effect, causing the length of belt connected between the rear vertical support member 1072 and the extension motor 1070 to decrease, and the length of belt connected between the forward vertical support member 952 and the extension motor 1070 to increase, causing the frame 104 to pivot forward. In other embodiments, cross-braces can be connected between opposite rear vertical support members 1072 and opposite forward vertical support members 952, with the trunk pivot belt 1066 connected at a first end to a midpoint for the rear cross-brace and at a second end to a midpoint for the forward cross-brace.

Figure 11:
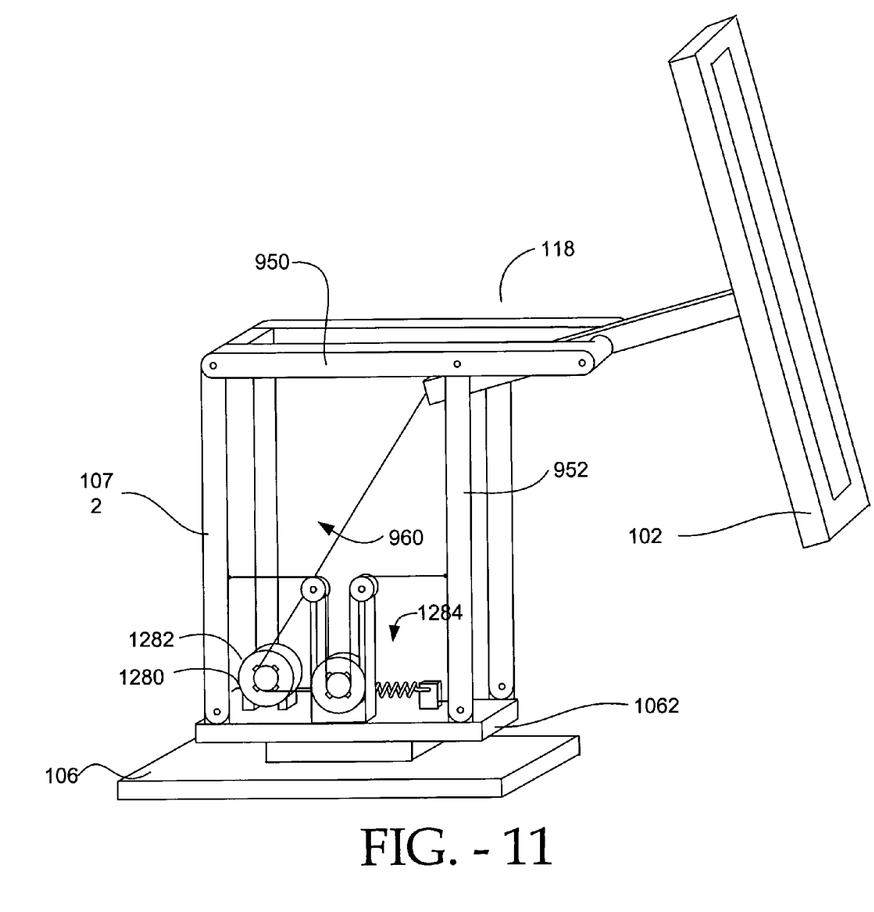
FIG. 11 is a close-up view of the pulley system for shifting the trunk forward or back.

A pivot motor 1280 connected with the platform 1062 can move a screen pivot belt 960 so that the neck 118 rotates about the forward pivot 958. As can be seen in FIG. 11, the screen pivot belt 960 can be connected at a first end to the sub-frame of the neck 118 and partially looped around a second cog 1282 connected with the pivot motor 1280 to connect with a spring 1284. The spring 1284 can be connected with the platform 1062, providing a counter-balance for minimizing the amount of torque load applied to the pivot motor by the mass of the screen 102. The spring 1074 can further remove slack from the screen pivot belt 960 as the second cog draws the belt down, thereby maintaining belt tension. While inactive, the mass of the screen 102 can cause the neck 118 to pivot, drawing the screen pivot belt 960 and stretching the spring 1062, causing the screen 102 to slowly droop down.

A rotation motor connected, for example, with the base 104 can control the rotation of the frame 104 about the rotatable bearing 106. Each motor can be connected with an independent, serial based motor controller, with each controller receiving commands from the local server 690. Further, each motor can include an encoder for determining the position of the device 100. For example, the rotation motor can include a 100,000 increment position encoder using optical or other means, providing fine resolution in rotational movement over approximately 200 degrees of rotation, while the extension and pivot motors can each include a position encoder having more or less increments. With the assumption that the motor never stalls or slips, speed and positioning of the motors can be accurately controlled without an encoder or a feedback mechanism.

As mentioned above, the inclusion of motors can require the device 100 to find home to determine initial position, for example when the device is powered up or awakened. When finding home, the device 100 will slowly move to a limit switch in one dimension before determining home in that dimension and finding home in a second dimension. Finding home can result in significant delay when waiting to enter a conference. Several strategies can shorten this delay. For example, the inactive mode can be oriented such that the tilt of the screen 102 is at a limit switch, so that the pivot motor is at the limit switch when the device 100 is awakened. Further, the inactive position can be programmed so that the extension motor is also at a limit switch. With both the extension and pivot defaulted at limit switches, only the rotation needs to be homed. The rotation motor can have a zero switch and a limit as well, so that if the rotation motor is at the zero switch, it need not home. It is possible for the device 100 to awaken and not move at all. However, if the device 100 is powered down, or loses power in the middle of a move, the device 100 must find home. In other embodiments, each motor can include a feedback mechanism, such as an optical encoder, thereby eliminating the need to home the device.

The frame 104 described above is only one example of a frame 104 capable of being used with a device 100 in accordance with embodiments of the present invention. In other embodiments, the device 100 can be articulated in multiple ways. For example, the frame 104 can comprise an upper arm driven by a servo motor, connected by a single pivot elbow joint to a forearm for supporting a screen 102 and including a servo motor for driving the forearm. By using a single, articulated "robot" style arm, the device 100 can be less bulky, but maybe much heavier, depending on the weight of the screen 102 (a lighter screen requires less powerful servo motors), though one of ordinary skill in the art can appreciate how belts can be used to transfer power from motors connected with the base to upper joints. In another embodiment the device 100 can comprise an arm having a vertical support similar to an upper arm, a forearm for supporting a screen, and an elbow joint for joining the forearm and upper arm. Motors need not be electrical; for instance, a motor can be pneumatic or hydraulic. Electroactive polymers, or artificial muscles, comprising lightweight strips of highly flexible plastic that bend or stretch and function similarly to biological muscles when subjected to electric voltage can join the upper arm and forearm. One of ordinary skill in the art can appreciate the multiple different means by which the screen 102 can be positioned so that the screen 102 is visible to participants positioned about a room.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

The invention claimed is:

1. A communication system comprising:
   a screen adapted to display a subject, the screen having a posture controllable by the subject;
   a camera adjacent to the screen and trainable on a desired location, the camera allowing the subject to view the desired location;
   wherein motion of the camera relative to the screen is confined such that when the camera is trained on the desired location, a gaze of the subject displayed by the screen appears substantially directed at the desired location;
   a base;
   a frame including:
      a platform rotatably mounted to the base,
      a trunk pivotably mounted to the platform;
      a neck pivotably mounted to the trunk;
   an extension motor mounted to the platform and adapted to pivot the trunk relative to the platform; and
   a pivot motor mounted to the platform and adapted to pivot the neck relative to the trunk;
   wherein the screen is connected with the neck.

2. The system of claim 1, wherein:
   when the camera is zoomed in the screen moves towards the desired location by pivoting the trunk forward relative to the platform.

3. The system of claim 1, wherein:
   when the camera is zoomed out the screen moves away from the desired location by pivoting the trunk backward relative to the platform.

4. A communication system, comprising:
   a base;
   a frame including:
      a platform rotatably mounted to the base,
      a trunk pivotably mounted to the platform;
      a neck pivotably mounted to the trunk;
   a display screen connected with the neck and adapted to display a subject;
   a camera adjacent to the display screen and trainable on a desired location, the camera allowing the subject to view the desired location; and
   a remote terminal accessible to the subject;
   wherein movement of the platform, the trunk, and the neck is controllable by the subject by way of the remote terminal.

5. The system of claim 4, further comprising:
   a means for pivoting the trunk relative to the platform; and
   a means for pivoting the neck relative to the trunk.

6. The communication system of claim 4, wherein the desired location includes a selected participant.

7. The communication system of claim 6, wherein the selected participant is one of a person, a second display screen, a telephone, an intercom, a video camera, a videoconferencing system, an audio recording device, and an audio/video recording device.

8. The communication system of claim 4, wherein the display screen is sized such that at least a portion of the subject including a face can be displayed at substantially full scale.

9. The communication system of claim 4, further comprising:
   at least one speaker for reproducing remote sounds from a remote location so that the remote sounds are audible at the desired location.

10. The communication system of claim 4, further comprising:
    at least one microphone for detecting sounds at the desired location so that the sounds at the desired location can be communicated to the subject.

11. The communication system of claim 10, wherein:
    the remote terminal displays an image captured by the camera to the subject; and
    movement of the platform, the trunk and the neck is controllable by a control arrangement connected with the remote terminal; and the control arrangement includes a means for controlling the posture of the display screen, thereby controlling a field of view of the camera.

12. The communication system of claim 11, further comprising:
at least one remote speaker connected with the remote terminal for reproducing sounds audible at a selectable proximity to the desired location so that the sounds are audible to the subject.

13. The communication system of claim 11, further comprising:
at least one remote microphone connected with the remote terminal for detecting remote sounds produced by the subject so that the remote sounds can be reproduced by the at least one speaker.

14. The communication system of claim 11, wherein the means for controlling the posture is at least one of a plurality of buttons, a keyboard, a joystick, a touch display screen, and a touchpad.

15. The communication system of claim 11 wherein the control arrangement further includes:
a means for zooming the camera so that the subject can adjust a field of view of the camera.

16. The communication system of claim 15, wherein the means for zooming is at least one of a plurality of buttons, a joystick, a keyboard, a touch display screen, and a touchpad.

17. The communication system of claim 11, wherein the control arrangement further includes:
a means for communicating a nonverbal gesture;
wherein the nonverbal gesture includes movement of the display screen.

18. The communication system of claim 17, wherein the means for communicating a nonverbal gesture is at least one of a plurality of buttons, a keyboard, a joystick, a touch display screen, and a touchpad.

19. The communication system of claim 17, wherein the nonverbal gesture is at least one of a nod performed by the display screen to indicate a positive response and a shake performed by the display screen to indicate a negative response.

20. The system of claim 17, wherein the nonverbal gesture is text displayed on the display screen.

21. The communication system of claim 11 wherein the at least one microphone is a microphone array adapted to identify a direction of origin of a sound.

22. The communication system of claim 21, wherein the remote viewer provides a visual indication of the direction of origin of a sound to the subject.

23. The communication system of claim 21, wherein the remote viewer provides an audible indication of the direction of origin of a sound to the subject.

* * * * *